US008032132B2

(12) United States Patent
Fratti et al.

(10) Patent No.: US 8,032,132 B2
(45) Date of Patent: Oct. 4, 2011

(54) REMOTE MANAGEMENT AND ANALYSIS TECHNIQUES IN CELLULAR AND SATELLITE RADIO NETWORKS

(75) Inventors: Roger A. Fratti, Shillington, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 58 days.

(21) Appl. No.: 10/944,716

(22) Filed: Sep. 21, 2004

(65) Prior Publication Data

US 2006/0063520 A1    Mar. 23, 2006

(51) Int. Cl.
*H04W 24/00*    (2009.01)
*H04M 3/00*    (2006.01)

(52) U.S. Cl. ........ 455/425; 455/423; 455/424; 455/418; 455/419; 455/67.7

(58) Field of Classification Search .................. 455/423, 455/422.1, 424, 425, 456.1–457, 226, 3.02, 455/115, 23, 67.11–67.7; 340/635; 379/1.01–35; 701/210, 213
See application file for complete search history.

(56) References Cited

U.S. PATENT DOCUMENTS

| 5,204,970 | A * | 4/1993 | Stengel et al. ................. 455/69 |
| 6,445,907 | B1 * | 9/2002 | Middeke et al. ........... 455/226.1 |
| 7,596,373 | B2 * | 9/2009 | McGregor et al. ............ 455/425 |
| 2001/0041566 | A1 | 11/2001 | Xanthos et al. |
| 2002/0098805 | A1 * | 7/2002 | King ............................... 455/63 |
| 2002/0137504 | A1 * | 9/2002 | Engholm et al. .............. 455/423 |
| 2003/0100299 | A1 * | 5/2003 | Ko et al. ........................ 455/423 |
| 2003/0216120 | A1 * | 11/2003 | Ceresoli et al. .............. 455/3.02 |
| 2003/0224806 | A1 * | 12/2003 | Hebron ......................... 455/457 |
| 2004/0203467 | A1 * | 10/2004 | Liu et al. .................... 455/67.14 |
| 2005/0213511 | A1 * | 9/2005 | Reece et al. .................. 370/252 |
| 2005/0288009 | A1 * | 12/2005 | Poletti .......................... 455/423 |

* cited by examiner

*Primary Examiner* — Charles Appiah
*Assistant Examiner* — Emem Stephen
(74) *Attorney, Agent, or Firm* — Ryan, Mason & Lewis, LLP

(57) ABSTRACT

Several system diagnostic and network management tools are disclosed that, as a primary goal, support the consumer's ability to self diagnose and solve an existing problem. A non-intrusive diagnostic tool is provided that exposes system parameters of a consumer system for remote analysis by qualified personnel. Important data parameters of a given radio receiver are preferably predetermined and gathered directly at the receiver. Then, they are uploaded via the Internet from a removable memory placed into an Internet terminal (e.g., PC), or through a temporary docking station connected to an Internet terminal. This leads toward quick and efficient problem resolution with a properly informed customer service representative that is crucial to enriching the consumer's experience. The data collected relating to relevant system parameters may be used by service providers to enhance or even in some cases enable services.

21 Claims, 5 Drawing Sheets

REMOTE MANAGEMENT AND ANALYSIS TECHNIQUES IN CELLULAR AND SATELLITE RADIO NETWORKS

BACKGROUND OF THE INVENTION

1. Field of the Invention

This invention relates to the technical and marketing challenges of satellite and cellular radio-based technology, including remote diagnostics and allowing for management by qualified personnel should a problem arise.

2. Background of Related Art

In a consumer-grade service offering, such as the emerging satellite radio market as well as the developing cellular radio market, it must be assumed that the consumer does not understand nor have the capability to diagnose and solve problems in these systems. When problems do arise, the consumer typically places a call to a call-center where a 'qualified' attendant is available to assist the user in diagnosing the problem and arriving at a solution for the same. This is a costly model as it makes lengthy use of a manned call-center.

For instance, to properly accomplish this task, a call-center attendant will attempt to gain insight into the consumer's system by asking relevant usage questions of the user, as well as questions relating to ascertaining a description of the problem(s).

To collect the usage pattern of receivers, the service provider normally has to do it by mail, phone based survey, or deploy a service technician into a given area. However, this results in high cost, is time consuming, and ultimately may be inaccurate. Also, all users are not necessarily active in response to such methods.

In a known solution, user applications that allow support information gathering of a given service are generally not available in Satellite Digital Audio Radio Service (SDARS) and cellular-based services. Data Management and collection tools to date have been provided for personnel that are 'skilled in the art' of network management. In most cases, deployment of a service technician into a given area to diagnose an issue is required. This is a time consuming and costly service. Residential applications, however, are consumer focused. Generally, residential consumers have little or no prior network management experience.

Remote management and analysis tools to date have been provided for Network Management personnel that are 'skilled in the art' of network management. These network management personnel generally need to be deployed to a given service area, e.g., when a customer complains that the cellular signal is lost, when the signal strength is degraded to an unacceptable level, or when general problems are occurring. Such deployment of a qualified service technician is a costly endeavor.

There is a need for a technique and apparatus for providing efficient, accurate and cost-effective analysis and correction of problems arising in consumer's satellite and cellular radio devices.

SUMMARY OF THE INVENTION

In accordance with the principles of the present invention, a diagnostic data collection module in a satellite radio, cellular radio, or WiFi type radio receiver comprises a diagnostic data memory designated to maintain a plurality of operating parameters relating to operation of the satellite, cellular or WiFi radio receiver. An operating parameters monitoring and storage module obtains operating parameters relating to operation of the satellite radio receiver and directs storage of the operating parameters into the diagnostic data memory.

In a satellite, cellular or WiFi type radio system in accordance with another aspect of the present invention, a method of gathering user pattern information comprises receiving via an Internet operating parameter data from each of a plurality of radio receivers. The operating parameter data is measured directly by each of the plurality of radio receivers, and is provided to a central area via an Internet terminal. A use pattern is determined based on the operating parameter data received from the plurality of satellite, cellular or WiFi type radio receivers.

BRIEF DESCRIPTION OF THE DRAWINGS

Features and advantages of the present invention will become apparent to those skilled in the art from the following description with reference to the drawings, in which.

DETAILED DESCRIPTION OF THE ILLUSTRATIVE EMBODIMENTS

Figure 1:
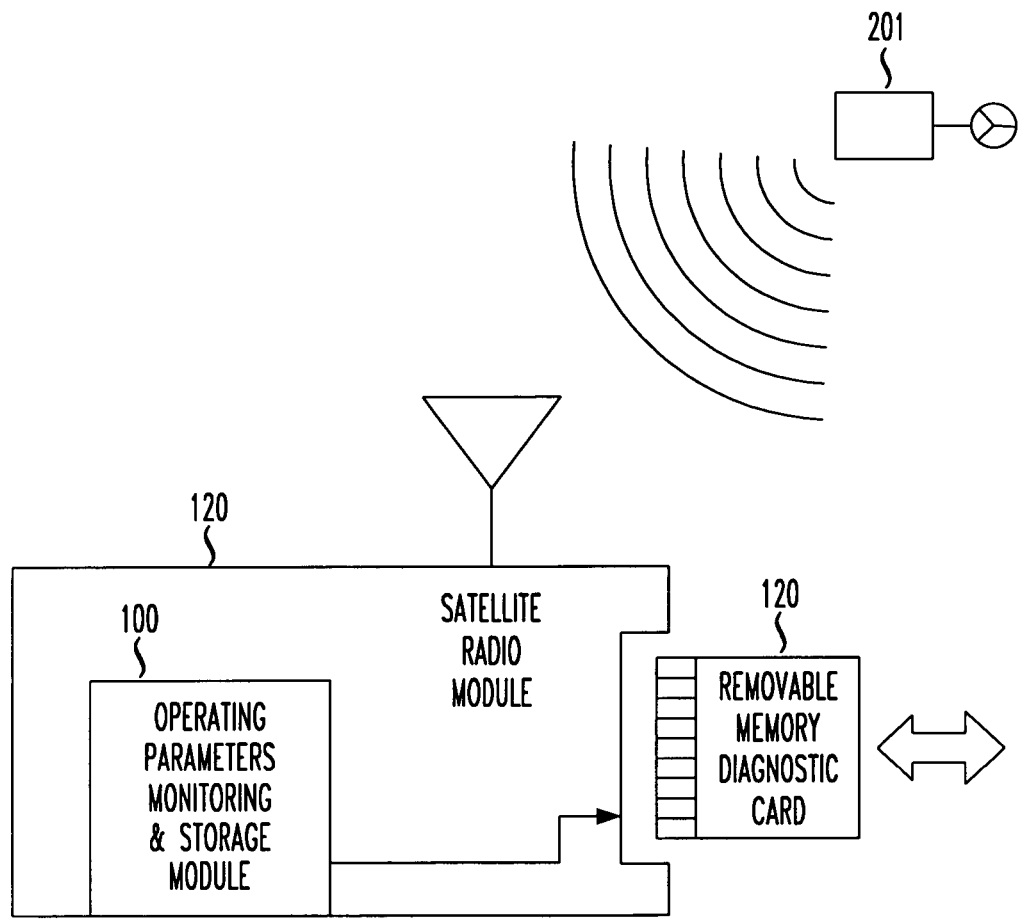
FIG. 1 shows an exemplary satellite radio including an operating parameters monitoring and storage module, and removable memory card, in accordance with the principles of the present invention.

The present invention streamlines customer support problem resolution by providing mechanisms in emerging cellular and satellite radio systems (a.k.a. pay radio systems) or wireless fidelity (WiFi) 'hotspot' deployment that enable simple and direct diagnostic tools coordinated between a consumer's actual device, and a representative at a technical call center.

The present invention provides the ability of systems to support spectral analysis of a given service coupled with characterization of other important networking elements which allow remote analysis by qualified service technicians, allowing insight into the customer system. Armed with the analysis method and techniques in accordance with the principles of the present invention, potential remediation efforts can be provided remotely, thus minimizing costs to the supplier. At the same time, a fairly non-intrusive remediation measure is provided for the customer.

When problems do arise, the consumer typically places a call to a call center, where a qualified attendant is made available to assist in diagnosing and solving the particular problem. However, the present inventors see this as a relatively costly model because of the costs of call centers, thus that call center time should generally be minimized.

In accordance with the invention, to properly accomplish this task, the attendant at the call center would best benefit from gaining direct insight into the consumer's system. When self-diagnosis is not possible, non-intrusive diagnostic data gathering tools are used to save data relating to various system parameters of the consumer system for subsequent remote analysis by qualified personnel. Using DSP-based techniques, the solutions disclosed herein are implemented with relative ease.

Several system diagnostic and network management tools are disclosed that, as a primary goal, support the consumer's ability to self diagnose and solve an existing problem. A non-intrusive diagnostic tool is provided that exposes system parameters of a consumer system for remote analysis by qualified personnel.

In accordance with the principles of the present invention, important data parameters of a given radio receiver are preferably predetermined and gathered directly at the receiver. Then, they are uploaded via the Internet from a removable memory placed into an Internet terminal (e.g., PC), or through a temporary docking station connected to an Internet terminal. This leads toward quick and efficient problem resolution with a properly informed customer service representative that is crucial to enriching the consumer's experience. The data collected relating to relevant system parameters in given groups or demographically similar users may be compiled by service providers to enhance existing services, or even in some cases enable new services.

Data gathering facilities may be provided within a receiving radio system, for later upload to a service provider for diagnostic analysis as necessary. This allows a given service provider data the ability to enhance or enable various diagnostic services. Associated data collection facilities are implemented within the provider's system to gather and maintain historical and relevant information about a particular user's radio receiver, allowing a call-center of a given service provider data the ability to remotely diagnose or troubleshoot a particular customer issue. The collection of data obtained directly by the radio receiver itself allows a given service provider the flexibility to ensure various qualities of service.

With the knowledge of particular aspects of a given consumer's radio receiver, a service provider may also have information enabling the possibility to download to the radio receiver various incremental software releases specific to the user's radio system, providing the ability to upgrade a given customer's radio receiver unit.

The present invention is applicable to many radio reception services, e.g., satellite broadcasting services, cellular telephony applications, and WiFi 'hotspot' deployment. In accordance with the principles of the present invention, data is collected directly from a consumer's radio receiver. The collected data is uploaded to a data collection server of a given service provider, e.g., using the Internet, making off-line analysis results readily and quickly available to call center personnel.

FIG. 1 shows an exemplary satellite radio including an operating parameters monitoring and storage module, and removable memory card, in accordance with the principles of the present invention.

In particular, FIG. 1 shows an exemplary satellite radio 120 that receives a radio broadcast from a satellite 201. While FIG. 1 shows a satellite radio in particular, the invention is equally applicable to emerging pay radio techniques such as cellular radio, as well as to WiFi application.

Importantly, the satellite radio 120 includes a removable memory diagnostic card 102. The removable memory diagnostic card may be any memory device which is adapted for easy installation and removal from the satellite radio 120, e.g., a CompactFlash Card, or an SD Memory Card.

The removable memory diagnostic card 102 need not be installed at all times in the satellite radio 120. For instance, the removable memory diagnostic card 102 may be installed during times of diagnosis, and removed from the satellite radio receiver and placed in an appropriate Internet terminal for upload of obtained diagnostic data when appropriate. However, it is preferred that the removable memory diagnostic card 102 be installed most of the time, so that historical information prior to the occurrence of any problems can be included in the diagnostic data uploaded to the call center database.

The particular diagnostic data stored in the removable memory diagnostic card 102 is obtained and stored under the control of an operating parameters monitoring and storage module 100. The storage module 100 is responsible for periodically or occasionally obtaining relevant, predetermined diagnostic data relating to the performance of the satellite radio 120, and for storing the same in the removable memory diagnostic card 102. Exemplary diagnostic data parameters may include, but are not limited to, receive strength signal indicator (RSSI), stations tuned to, location(s) that the satellite radio 120 has been operated in, etc.

As depicted in FIG. 1, the removable memory diagnostic card 102 may be easily removed by the user of the satellite radio 120, preferably without the need for disassembly of the satellite radio module or its mounting.

The removable memory diagnostic card may be connected directly in the satellite radio module 120, or may be connected via a suitable interface. For instance, the satellite radio module 120 may include a serial bus port (e.g., Universal Serial Bus (USB)), into which a small memory device such as a USB Memory Drive may be plugged.

Figure 2:
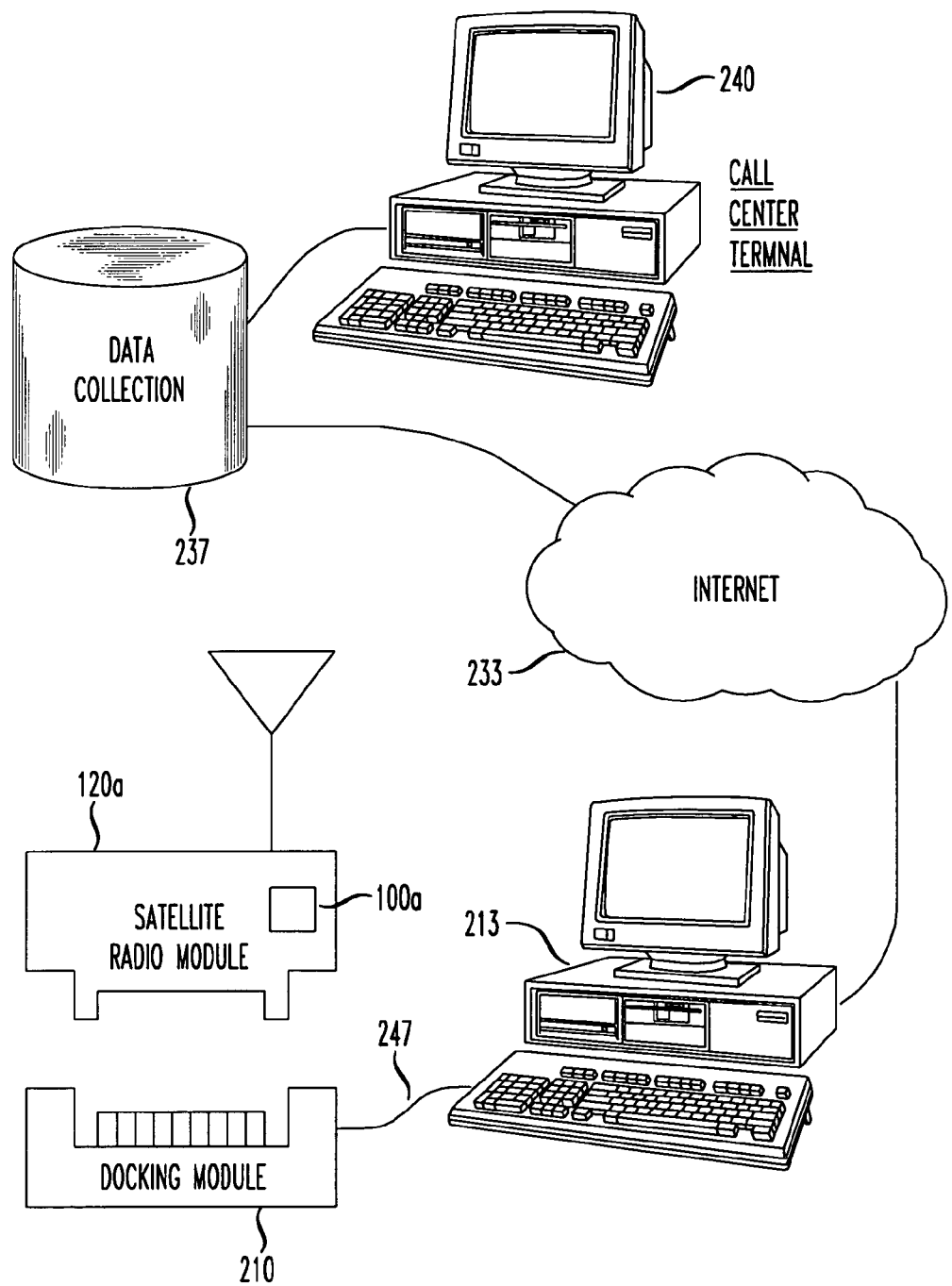
FIG. 2 shows an exemplary satellite radio including an operating parameters monitoring and storage module, and a docking interface, in accordance with another aspect of the present invention.

FIG. 2 shows an exemplary satellite radio including an operating parameters monitoring and storage module, and a docking interface, in accordance with another aspect of the present invention.

In particular, FIG. 2 shows an alternative to the removable memory diagnostic card 102 shown in FIG. 1, i.e., use of a docking module 210. In the embodiment of FIG. 2, it is presumed that all or some portion of the satellite radio 120a is portable enough to move to a docking station comprised of a mating docking module 210 interfaced to an appropriate Internet terminal 213. In the disclosed embodiment, the Internet terminal 213 is a desktop PC. However, the Internet terminal may be any suitable device that can interface between the docking module 210 and the Internet 233 (e.g., a cell phone with a SMARTPHONE™ operating system and a serial interface (e.g., USB) to the docking module 210).

In the example of FIG. 2, diagnostic data is obtained under the control of an operating parameters monitoring and storage module 100, and stored into suitable memory in the satellite radio 120a (e.g., into Flash memory). Then, when necessary to upload the diagnostic data, the satellite radio 120a is docked in the docking module 210 such that an application program running in the Internet terminal 213 is given access to the information contained in the diagnostic memory area (e.g., in the flash memory). The diagnostic data may be uploaded into a suitable data collection database 237 maintained by the service provider for later or current access by a call center operator operating a call center terminal 240. The diagnostic data may be uploaded only occasionally by the user, or as part of a regular program of uploads (e.g., every week, every month, etc.) The service provider may provide incentives to the user to conduct the uploading process, e.g., by offering free upgrades of software for the satellite radio 120*a*, by offering free downloads of audio media, etc.

The present invention provides the ability to take samples directly from the line or medium and pass them along to the host processing element for off-line processing. This inventive technique provides a 'built-in' system spectrum analyzer that allows spectral analysis and plots to be generated of network and the available coverage parameters within that given network. Furthermore, a complete characterization of noise and other potential elements that lead to a system degradation can be performed. Armed with this analysis technique, potential remediation efforts can be provided remotely, thereby minimizing costs to the supplier. At the same time, they offer fairly non-intrusive remediation measures for the customer. Using digital signal processing (DSP)-based techniques, the solution described herein can be implemented with relative ease.

It is most preferable that the particular data obtained be defined and employed within a defacto or actual industry specification or standard, though this is not a requirement for the invention. However, such standardization would provide consistency in collected data, and therefore allow support of multi-vendor offerings within a common network. It is further preferred that important or the most useful data parameters be predefined in such manner, and even better yet if a consistent method for collecting that data was provided within an industry specification or standard.

A personal computer 213 may also be used for the bridge between the satellite radio receiver 120*a* and the Internet 233, as shown in FIG. 2. It is preferred that the subscriber be properly authorized to provide the data. Thus, after the subscriber's authorization is verified, use patterns and other diagnostic data that is stored in the diagnostic memory area (e.g., flash memory, or removable memory diagnostic card 102) can be up-loaded to the service provider's call center terminal 240 or other server via the Internet 233. After the appropriate diagnostic data is uploaded from the authorized user, off-line processing may occur, e.g., as a background task at the service provider's facility to optimize the user's system as necessary.

Thus, in accordance with the principles of the present invention, if a user's satellite radio receiver, cellular radio receiver, or WiFi receiver begins to fail or otherwise exhibit problematic behavior, the diagnostic data collected directly by the user's satellite radio, stored in the appropriate diagnostic memory area, and uploaded to the service provider, will provide vital and important insight not only into the user's system, but also possibly as to the general health of the radio system in the user's locale. For instance, a profile of a given coverage area may be inferred, and used to ensure that the broadcast signal from the satellite radio system is performing per expectations. Resultant actions can then be taken on a system wide level even if problems are discovered on a user-by-user basis.

On the cellular radio service side, similar techniques as described above for the satellite-based radio receiver system can be applied in an effort to gain knowledge about the coverage footprint of a given service area. For instance, transmission strength of the broadcast radio signal strength at the receiver back to a cell tower along with spatial information which can be obtained during cell switching and adjacent cell hand-off signaling for use in mapping radiation patterns of antenna arrays throughout the cellular network. Such information can be based on diagnostic data uploaded unobtrusively to the cellular service site periodically through an appropriate web browser interface residing on the Internet terminal 213.

In another embodiment, the satellite radio may be combined with a global positioning satellite (GPS) type device, allowing positioning data vs. location information to be derived from uploaded diagnostic customer data.

Figure 3:
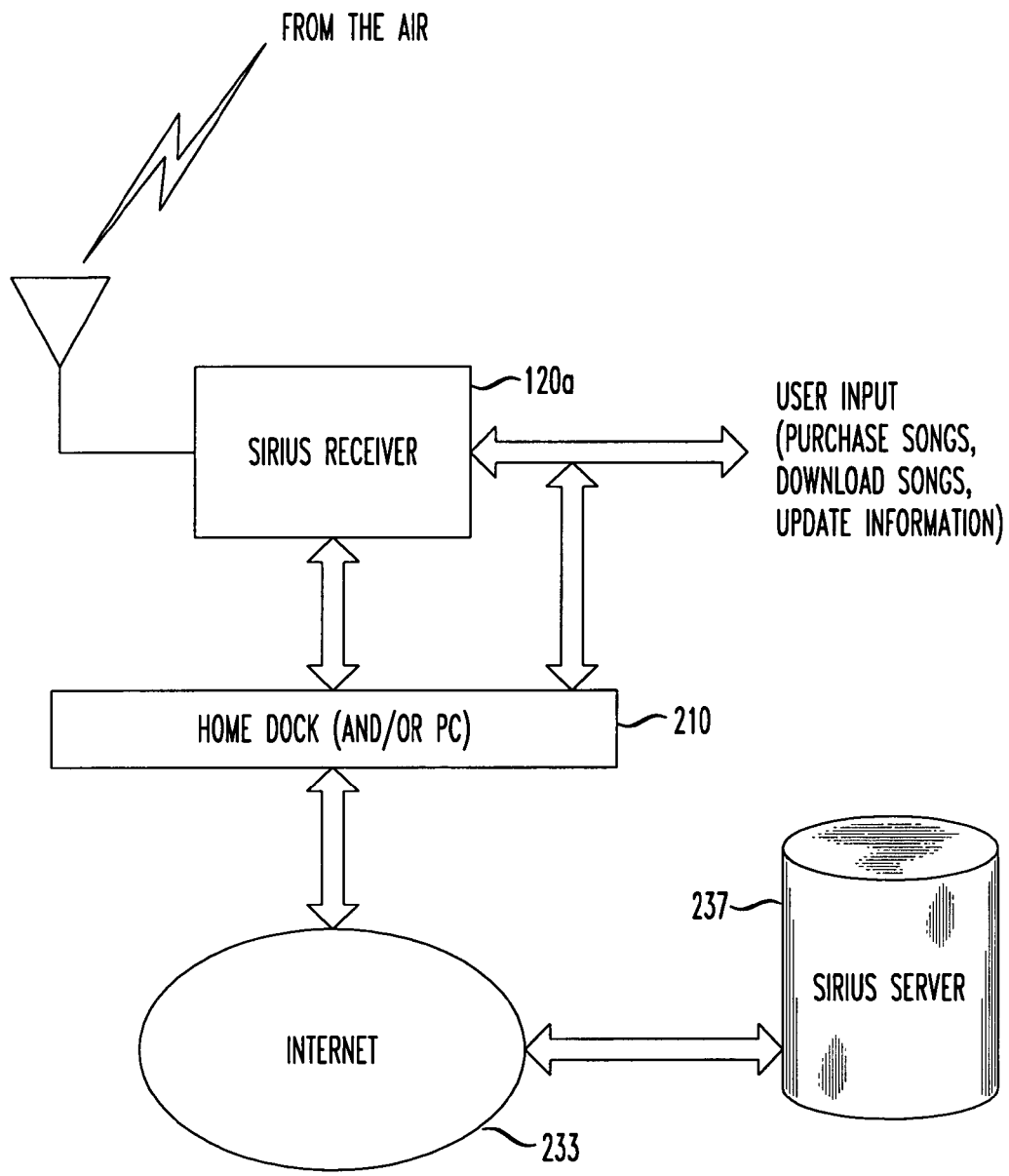
FIG. 3 shows an exemplary simplified block diagram of a dockable satellite radio receiver such as is shown in FIG. 2, when docked with an Internet terminal and communicating with a service provider's relevant server, in accordance with the principles of the present invention.

FIG. 3 shows an exemplary simplified block diagram of a dockable satellite radio receiver such as is shown in FIG. 2, when docked with an Internet terminal and communicating with a service provider's relevant server, in accordance with the principles of the present invention.

In particular, FIG. 3 shows the satellite radio (e.g., a SERIUS or XM radio receiver) that is docked into an appropriate docking module 210. The docking module 210 provides an access path to the service provider's server 237 via the Internet 233.

Thus, as shown in FIG. 3, the satellite receiver 120*a* can be put into a home dock or cradle 210 for access to the Internet 233.

While docked, the user preferably also has the capability to download and record content received via the Internet 233, as well as from the air directly. Such downloaded programs and music may be stored in suitable non-volatile memory, or hard drive of the PC 213.

The uploaded diagnostic data may be periodically or occasionally made available to service provider managed services like unit service contracts, from which a quality of service can be measured and a goal arrived at. This may be enabled by the analysis of diagnostic data obtained directly from a consumer's radio receiver in the disclosed 'off-line' manner, from which general subscriber unit condition is ascertained.

Figure 4:
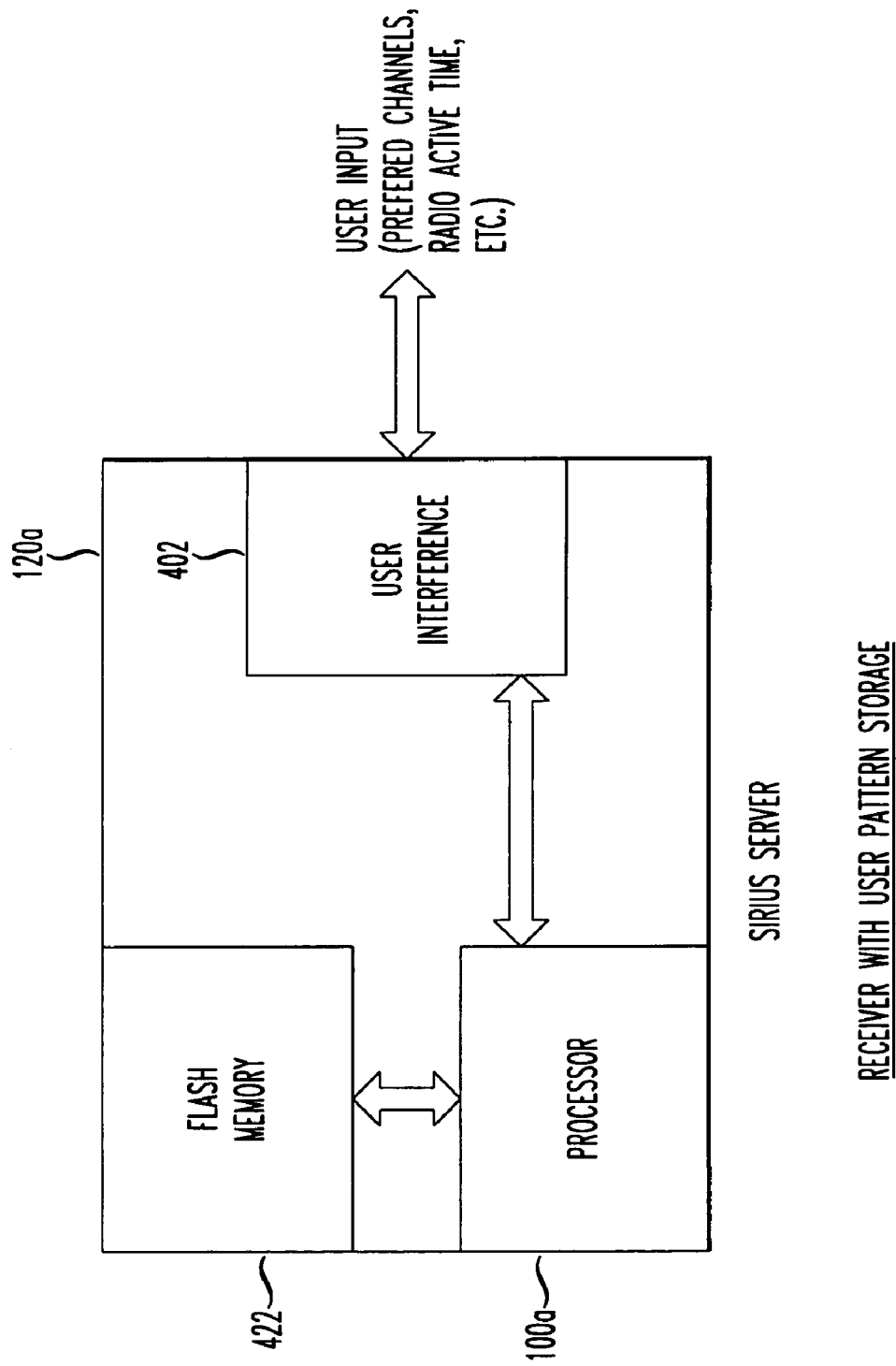
FIG. 4 shows an exemplary simplified block diagram of the removable memory diagnostic card shown in FIG. 3 when installed in a relevant satellite radio receiver.

FIG. 4 shows an exemplary simplified block diagram of the removable memory diagnostic card shown in FIG. 3 when installed in a relevant satellite radio receiver.

In particular, as shown in FIG. 4, user patterns such as the frequency of each channel/program selected, the most active time window during which the radio is listened to, etc., are processed by the processor and stored in a diagnostic memory area, e.g., in a Flash memory card 422. Other parameters of interest for storage include received signal strength, and possibly when combined with GPS-type interfaces, positioning data vs. location information.

Figure 5:
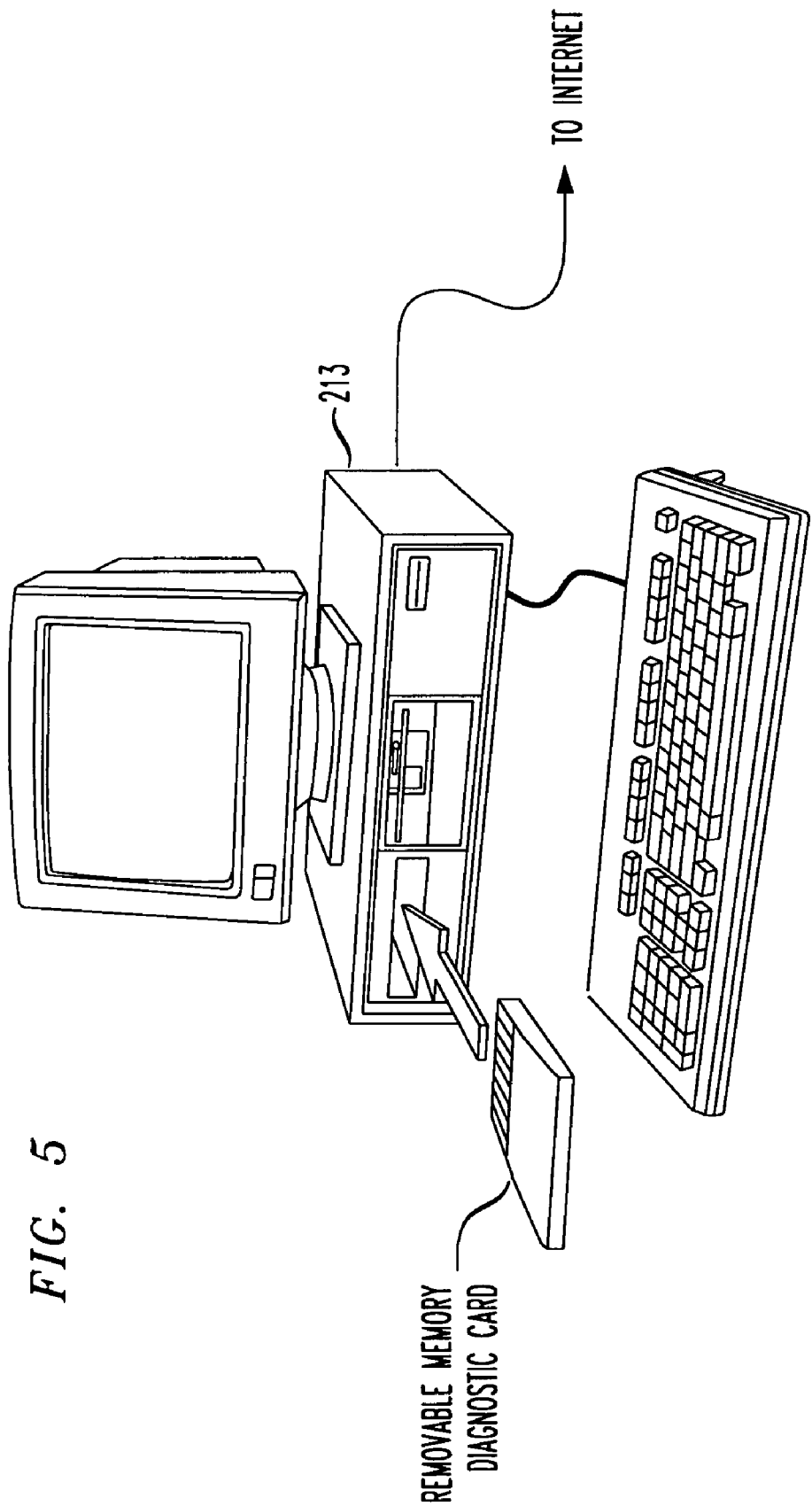
FIG. 5 shows an exemplary direct transfer of parameter data by removal of a parameters memory card from a relevant satellite radio and insertion of the same into an Internet terminal, in accordance with yet another aspect of the present invention.

FIG. 5 shows an exemplary direct transfer of parameter data by removal of a removable memory diagnostic card 102 containing diagnostic parameters obtained by a particular satellite radio receiver, and insertion of the same into an Internet terminal 213, in accordance with yet another aspect of the present invention.

The present invention may be implemented with one or more privacy settings such that only certain general information may be collected and provided to the service provider. For instance, a privacy setting may be established which does not allow collection of data relating to which stations are listened to the most by the user.

The present invention has particular application with cellular services, or other satellite radio endpoints implementing off-line analysis tools; cellular services or other satellite radio devices that allow system data collection for the purposes of network characterization to be taken non-intrusively; and with cellular services or satellite radio terminals that support spectrum analysis techniques for remote analysis.

While the invention has been described with reference to the exemplary embodiments thereof, those skilled in the art will be able to make various modifications to the described embodiments of the invention without departing from the true spirit and scope of the invention.

What is claimed is:

1. In a cellular radio receiver, a diagnostic data collection module comprising:

a diagnostic data memory in said cellular radio receiver designated to maintain a plurality of operating parameters gathered during operation of said cellular radio receiver and relating to operation of said cellular radio receiver;

an operating parameters monitoring and storage module for obtaining operating parameters relating to operation of said cellular radio receiver and for directing storage of said operating parameters into said diagnostic data memory;

a digital signal processor for determining a noise characterization based on said operating parameters;

a spectrum analyzer for determining a spectrum analysis based on said operating parameters;

wherein said operating parameters maintained in said diagnostic data memory comprise a plurality of received signal strength indicators each associated with a different location within a cellular network of the cellular radio receiver;

wherein said operating parameters and said noise characterization are subsequently delivered from the diagnostic data memory to a service provider of the cellular network via an Internet interface and processed by the service provider with operating parameters gathered by other cellular radio receivers so as to characterize a coverage area of the cellular network;

wherein said spectrum analysis is subsequently delivered from the diagnostic data collection module to the service provider of the cellular network via the Internet interface and processed by the service provider; and wherein at least a portion of said plurality of operating parameters are gathered during normal operation of said cellular radio receiver by a consumer other than the service provider.

2. In a cellular radio receiver, a diagnostic data collection module according to claim 1, further comprising:
a docking interface adapted to allow docking of said cellular radio receiver into an Internet terminal.

3. In a cellular radio receiver, a diagnostic data collection module according to claim 1, wherein:
said diagnostic data memory is user-removable from said cellular radio receiver for insertion into an Internet terminal.

4. In a cellular radio receiver, a diagnostic data collection module according to claim 1, wherein:
said plurality of operating parameters include multiple samples of a same parameter each relating to a different time of operation of said cellular radio receiver.

5. In a cellular radio receiver, a diagnostic data collection module according to claim 1, wherein:
said cellular radio receiver is operable as a subscription enabled receiver.

6. In a cellular radio receiver, a diagnostic data collection module according to claim 1, wherein:
said plurality of operating parameters includes location information relating to where said cellular radio receiver was located when a relevant operating parameter was sampled.

7. In a wireless fidelity (WiFi) radio receiver, a diagnostic data collection module comprising:
a diagnostic data memory in said WiFi radio receiver designated to maintain a plurality of operating parameters gathered during operation of said WiFi radio receiver and relating to operation of said WiFi radio receiver;

an operating parameters monitoring and storage module for obtaining operating parameters relating to operation of said WiFi radio receiver and for directing storage of said operating parameters into said diagnostic data memory;

a digital signal processor for determining a noise characterization based on said operating parameters; and a spectrum analyzer for determining a spectrum analysis based on said operating parameters;

wherein said operating parameters maintained in said diagnostic data memory comprise a plurality of received signal strength indicators each associated with a different location within a WiFi network of the WiFi radio receiver;

wherein said operating parameters and said noise characterization are subsequently delivered from the diagnostic data memory to a service provider of the WiFi network via an Internet interface and processed by the service provider with operating parameters gathered by other WiFi radio receivers so as to characterize a coverage area of the WiFi network;

wherein said spectrum analysis is subsequently delivered from the diagnostic data collection module to the service provider of the WiFi network via the Internet interface and processed by the service provider; and wherein at least a portion of said plurality of operating parameters are gathered during normal operation of said WiFi radio receiver by a consumer other than the service provider.

8. In a wireless fidelity (WiFi) radio receiver, a diagnostic data collection module according to claim 7, further comprising:
a docking interface adapted to allow docking of said WiFi radio receiver into an Internet terminal.

9. In a wireless fidelity (WiFi) radio receiver, a diagnostic data collection module according to claim 7, wherein:
said diagnostic data memory is user-removable from said WiFi radio receiver for insertion into an Internet terminal.

10. In a wireless fidelity (WiFi) radio receiver, a diagnostic data collection module according to claim 7, wherein:
said plurality of operating parameters include multiple samples of a same parameter each relating to a different time of operation of said WiFi radio receiver.

11. In a wireless fidelity (WiFi) radio receiver, a diagnostic data collection module according to claim 7, wherein:
said WiFi radio receiver is operable as a subscription enabled receiver.

12. In a wireless fidelity (WiFi) radio receiver, a diagnostic data collection module according to claim 7, wherein:
said plurality of operating parameters includes location information relating to where said WiFi radio receiver was located when a relevant operating parameter was sampled.

13. In a satellite radio receiver, a diagnostic data collection module comprising:
a diagnostic data memory in said satellite radio receiver designated to maintain a plurality of operating parameters gathered during operation of said satellite radio receiver and relating to operation of said satellite radio receiver;

an operating parameters monitoring and storage module for obtaining operating parameters relating to operation of said satellite radio receiver and for directing storage of said operating parameters into said diagnostic data memory;

a digital signal processor for determining a noise characterization based on said operating parameters; and a spectrum analyzer for determining a spectrum analysis based on said operating parameters;

wherein said operating parameters maintained in said diagnostic data memory comprise a plurality of received signal strength indicators each associated with a different location within a satellite network of the satellite radio receiver;

wherein said operating parameters and said noise characterization are subsequently delivered from the diagnostic data memory to a service provider of the satellite network via an Internet interface and processed by the service provider with operating parameters gathered by other satellite radio receivers so as to characterize a coverage area of the satellite network;

wherein said spectrum analysis is subsequently delivered from the diagnostic data collection module to the service provider of the satellite network via the Internet interface and processed by the service provider; and wherein at least a portion of said plurality of operating parameters are gathered during normal operation of said satellite radio receiver by a consumer other than the service provider.

14. In a satellite radio receiver, a diagnostic data collection module according to claim 13, further comprising:
a docking interface adapted to allow docking of said satellite radio receiver into an Internet terminal.

15. In a satellite radio receiver, a diagnostic data collection module according to claim 13, wherein:
said diagnostic data memory is user-removable from said satellite radio receiver for insertion into an Internet terminal.

16. In a satellite radio receiver, a diagnostic data collection module according to claim 13, wherein:
said plurality of operating parameters include multiple samples of a same parameter each relating to a different time of operation of said satellite radio receiver.

17. In a satellite radio receiver, a diagnostic data collection module according to claim 13, wherein:
said satellite radio receiver is operable as a subscription enabled receiver.

18. In a satellite radio receiver, a diagnostic data collection module according to claim 13, wherein:
said plurality of operating parameters includes location information relating to where said satellite radio receiver was located when a relevant operating parameter was sampled.

19. In a cellular radio receiver, a diagnostic data collection module according to claim 1, further comprising:
a spectrum analyzer for determining a spectrum analysis based on said operating parameters;
wherein said spectrum analysis is subsequently delivered from the diagnostic data memory to the service provider of the cellular network via the Internet interface and processed by the service provider.

20. In a wireless fidelity (WiFi) radio receiver, a diagnostic data collection module according to claim 7, further comprising:
a spectrum analyzer for determining a spectrum analysis based on said operating parameters;
wherein said spectrum analysis is subsequently delivered from the diagnostic data memory to the service provider of the WiFi network via the Internet interface and processed by the service provider.

21. In a satellite radio receiver, a diagnostic data collection module according to claim 13, further comprising:
a spectrum analyzer for determining a spectrum analysis based on said operating parameters;
wherein said spectrum analysis is subsequently delivered from the diagnostic data memory to the service provider of the satellite network via the Internet interface and processed by the service provider.

* * * * *